United States Patent
Gordon et al.

(10) Patent No.: US 10,643,256 B2
(45) Date of Patent: May 5, 2020

(54) CONFIGURING A SELF-DRIVING VEHICLE FOR CHARITABLE DONATIONS PICKUP AND DELIVERY

(71) Applicant: International Business Machines Corporation, Armonk, NY (US)

(72) Inventors: Michael S. Gordon, Yorktown Heights, NY (US); James R. Kozloski, New Fairfield, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 15/267,311

(22) Filed: Sep. 16, 2016

(65) Prior Publication Data

US 2018/0082343 A1 Mar. 22, 2018

(51) Int. Cl.
| | |
|---|---|
| *G06Q 30/02* | (2012.01) |
| *G06Q 10/06* | (2012.01) |
| *G06Q 10/08* | (2012.01) |
| *G01C 21/34* | (2006.01) |
| *B60G 17/0165* | (2006.01) |
| *B60W 10/22* | (2006.01) |
| *G05D 1/02* | (2020.01) |

(Continued)

(52) U.S. Cl.
CPC ..... *G06Q 30/0279* (2013.01); *B60G 17/0165* (2013.01); *G01C 21/3407* (2013.01);
(Continued)

(58) Field of Classification Search
CPC ........... G06Q 30/0279; G06Q 10/0635; G06Q 10/083; G05D 1/021; G01C 21/32
See application file for complete search history.

(56) References Cited

U.S. PATENT DOCUMENTS

| 4,665,395 A | 5/1987 | Van Ness |
| 4,908,988 A | 3/1990 | Yamamura et al. |

(Continued)

FOREIGN PATENT DOCUMENTS

| CA | 2447554 A1 | 11/2000 |
| CN | 1135063 | 11/1996 |

(Continued)

OTHER PUBLICATIONS

Vaidyanathan, "A reflexive vehicle control architecture based on a neural model of the cockroach escape response," 2011, Journal of Systems and Control Engineering, vol. 226, No. 5, pp. 699-718.*

(Continued)

*Primary Examiner* — Ivan R Goldberg
(74) *Attorney, Agent, or Firm* — Law Office of Jim Boice

(57) ABSTRACT

A method configures and maneuvers a self-driving vehicle to deliver a charitable item. One or more processors receive a first message indicating that a donor has a charitable item available for pickup from a pickup location, and a second message indicating that a recipient at a delivery location has a need for the charitable item. The processor(s) match the charitable item to a self-driving vehicle (SDV) that is configurable to transport the charitable item from the pickup location to the delivery location. In response to a risk analysis concluding that a level of a need for the charitable item is greater than a risk to the charitable item and the SDV when transporting the charitable item to the delivery location, the processor(s) modify one or more physical components of the SDV in order to transport the charitable item from the pickup location to the delivery location.

19 Claims, 7 Drawing Sheets

(51) Int. Cl.
*G05D 1/00* (2006.01)
*B66F 9/06* (2006.01)
*G01C 21/32* (2006.01)

(52) U.S. Cl.
CPC ....... *G06Q 10/0635* (2013.01); *G06Q 10/083* (2013.01); *B60W 10/22* (2013.01); *B66F 9/063* (2013.01); *G01C 21/32* (2013.01); *G01C 21/343* (2013.01); *G05D 1/0088* (2013.01); *G05D 1/021* (2013.01)

(56) References Cited

U.S. PATENT DOCUMENTS

| | | |
|---|---|---|
| 5,975,791 A | 11/1999 | McCulloch |
| 6,064,970 A | 5/2000 | McMillian et al. |
| 6,201,318 B1 | 3/2001 | Guillory |
| 6,326,903 B1 | 12/2001 | Gross et al. |
| 6,393,362 B1 | 5/2002 | Burns |
| 6,502,035 B2 | 12/2002 | Levine |
| 6,587,043 B1 | 7/2003 | Kramer |
| 6,622,082 B1 | 9/2003 | Schmidt et al. |
| 6,731,202 B1 | 5/2004 | Klaus |
| 6,810,312 B2 | 10/2004 | Jammu et al. |
| 7,124,088 B2 | 10/2006 | Bauer et al. |
| 7,580,782 B2 | 8/2009 | Breed et al. |
| 7,769,544 B2 | 8/2010 | Blesener et al. |
| 7,877,269 B2 | 1/2011 | Bauer et al. |
| 7,894,951 B2 | 2/2011 | Norris et al. |
| 7,979,173 B2 | 7/2011 | Breed |
| 8,031,062 B2 | 10/2011 | Smith |
| 8,045,455 B1 | 10/2011 | Agronow et al. |
| 8,078,349 B1 | 12/2011 | Prada Gomez et al. |
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,146,703 B2 | 4/2012 | Baumann et al. |
| 8,152,325 B2 | 4/2012 | McDermott |
| 8,180,322 B2 | 5/2012 | Lin et al. |
| 8,346,480 B2 | 1/2013 | Trepagnier et al. |
| 8,352,112 B2 | 1/2013 | Mudalige |
| 8,442,854 B2 | 5/2013 | Lawton et al. |
| 8,466,807 B2 | 6/2013 | Mudalige |
| 8,489,434 B1 | 7/2013 | Otis et al. |
| 8,583,365 B2 | 11/2013 | Jang et al. |
| 8,660,734 B2 | 2/2014 | Zhu et al. |
| 8,676,466 B2 | 3/2014 | Mudalige |
| 8,678,701 B1 | 3/2014 | Aldasem |
| 8,786,461 B1 | 7/2014 | Daudelin |
| 8,810,392 B1 | 8/2014 | Teller et al. |
| 8,816,857 B2 | 8/2014 | Nordin et al. |
| 8,874,305 B2 | 10/2014 | Dolgov et al. |
| 8,880,270 B1 | 11/2014 | Ferguson et al. |
| 8,892,451 B2 | 11/2014 | Everett |
| 8,903,591 B1 | 12/2014 | Ferguson et al. |
| 8,923,890 B1 | 12/2014 | White et al. |
| 8,935,034 B1 | 1/2015 | Zhu |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,970,362 B2 | 3/2015 | Morley et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,024,787 B2 | 5/2015 | Alshinnawi et al. |
| 9,123,049 B2 | 9/2015 | Hyde et al. |
| 9,170,327 B2 | 10/2015 | Choe et al. |
| 9,189,897 B1 | 11/2015 | Stenneth |
| 9,194,168 B1 | 11/2015 | Lu et al. |
| 9,216,745 B2 | 12/2015 | Beardsley et al. |
| 9,218,698 B2 | 12/2015 | Ricci |
| 9,286,520 B1 | 3/2016 | Lo et al. |
| 9,317,033 B2 | 4/2016 | Ibanez-Guzman et al. |
| 9,381,915 B1 | 7/2016 | Crombez et al. |
| 9,390,451 B1 | 7/2016 | Slusar |
| 9,399,472 B2 | 7/2016 | Minoiu-Enache |
| 9,463,805 B2 | 10/2016 | Kirsch et al. |
| 9,483,948 B1 | 11/2016 | Gordon et al. |
| 9,524,648 B1 * | 12/2016 | Gopalakrishnan ...... B64C 39/00 |
| 9,552,735 B2 | 1/2017 | Pilutti et al. |
| 9,566,958 B2 | 2/2017 | Waldmann |
| 9,566,986 B1 | 2/2017 | Gordon et al. |
| 9,587,952 B1 | 3/2017 | Slusar |
| 9,628,975 B1 | 4/2017 | Watkins et al. |
| 9,646,496 B1 | 5/2017 | Miller |
| 9,718,468 B2 | 8/2017 | Barfield et al. |
| 9,754,235 B1 | 9/2017 | Konrardy |
| 9,834,224 B2 | 12/2017 | Gordon et al. |
| 9,944,291 B2 | 4/2018 | Gordon |
| 10,042,359 B1 | 8/2018 | Konrardy |
| 10,093,322 B2 | 10/2018 | Gordon |
| 2002/0026841 A1 | 3/2002 | Svendsen |
| 2002/0128774 A1 | 9/2002 | Takezaki et al. |
| 2003/0065572 A1 | 4/2003 | McNee et al. |
| 2003/0076981 A1 | 4/2003 | Smith et al. |
| 2004/0078133 A1 | 4/2004 | Miller |
| 2004/0117086 A1 | 6/2004 | Rao et al. |
| 2004/0199306 A1 | 10/2004 | Helmann et al. |
| 2005/0021227 A1 | 1/2005 | Matsumoto et al. |
| 2005/0104745 A1 | 5/2005 | Bachelder et al. |
| 2006/0106671 A1 | 5/2006 | Biet |
| 2006/0163939 A1 | 7/2006 | Yuramochi et al. |
| 2006/0200379 A1 | 9/2006 | Biet |
| 2006/0241855 A1 | 10/2006 | Joe et al. |
| 2007/0100687 A1 | 5/2007 | Yoshikawa |
| 2007/0124027 A1 | 5/2007 | Betzitza et al. |
| 2007/0265754 A1 | 11/2007 | Curtis et al. |
| 2008/0048850 A1 | 2/2008 | Yamada |
| 2008/0065293 A1 | 3/2008 | Placke et al. |
| 2008/0114663 A1 | 5/2008 | Watkins et al. |
| 2008/0129475 A1 | 6/2008 | Breed et al. |
| 2008/0201217 A1 | 8/2008 | Bader et al. |
| 2008/0288406 A1 | 11/2008 | Seguin et al. |
| 2009/0094109 A1 | 4/2009 | Aaronson et al. |
| 2009/0138168 A1 | 5/2009 | Labuhn et al. |
| 2009/0248231 A1 | 10/2009 | Kamiya |
| 2009/0313096 A1 | 12/2009 | Tomoya Kama |
| 2010/0057511 A1 | 3/2010 | Mansouri et al. |
| 2010/0156672 A1 | 6/2010 | Yoo et al. |
| 2010/0179720 A1 | 7/2010 | Lin et al. |
| 2010/0228427 A1 | 9/2010 | Anderson et al. |
| 2010/0256852 A1 | 10/2010 | Mudalige |
| 2010/0324781 A1 * | 12/2010 | Gagliano ........... B60G 17/0165 701/39 |
| 2011/0029173 A1 | 2/2011 | Hyde et al. |
| 2011/0035250 A1 | 2/2011 | Finucan |
| 2011/0077807 A1 | 3/2011 | Hyde et al. |
| 2011/0077808 A1 | 3/2011 | Hyde et al. |
| 2011/0137699 A1 | 6/2011 | Ben-Ari et al. |
| 2011/0264521 A1 | 10/2011 | Straka |
| 2012/0072243 A1 | 3/2012 | Collins et al. |
| 2012/0083960 A1 | 4/2012 | Zhu |
| 2012/0123646 A1 * | 5/2012 | Mantini ............... B60G 17/019 701/48 |
| 2012/0139756 A1 | 6/2012 | Djurkovic |
| 2012/0277947 A1 | 11/2012 | Boehringer et al. |
| 2012/0293341 A1 | 11/2012 | Lin |
| 2013/0030657 A1 | 1/2013 | Chatterjee et al. |
| 2013/0113634 A1 | 5/2013 | Hutchinson et al. |
| 2013/0131949 A1 | 5/2013 | Shida |
| 2013/0144502 A1 | 6/2013 | Shida |
| 2013/0231824 A1 | 9/2013 | Wilson et al. |
| 2013/0261871 A1 | 10/2013 | Hobbs et al. |
| 2013/0304513 A1 | 11/2013 | Hyde et al. |
| 2013/0304514 A1 | 11/2013 | Hyde |
| 2014/0019259 A1 | 1/2014 | Dung et al. |
| 2014/0032049 A1 | 1/2014 | Moshchuk et al. |
| 2014/0092332 A1 | 4/2014 | Price |
| 2014/0095214 A1 | 4/2014 | Mathe et al. |
| 2014/0129073 A1 | 5/2014 | Ferguson |
| 2014/0136045 A1 | 5/2014 | Zhu et al. |

(56) References Cited

U.S. PATENT DOCUMENTS

| | | |
|---|---|---|
| 2014/0136414 A1* | 5/2014 | Abhyanker ............ G06Q 50/28 705/44 |
| 2014/0164126 A1 | 6/2014 | Nicholas et al. |
| 2014/0188999 A1 | 7/2014 | Leonard et al. |
| 2014/0195213 A1 | 7/2014 | Kozloski et al. |
| 2014/0201037 A1 | 7/2014 | Mallawarachchi et al. |
| 2014/0201126 A1 | 7/2014 | Zadeh |
| 2014/0214255 A1 | 7/2014 | Dolgov et al. |
| 2014/0214260 A1 | 7/2014 | Eckert et al. |
| 2014/0222277 A1 | 8/2014 | Tsimhoni et al. |
| 2014/0222577 A1 | 8/2014 | Abhyanker |
| 2014/0257621 A1* | 9/2014 | Zych ............. G01C 21/20 701/25 |
| 2014/0282967 A1 | 9/2014 | Maguire |
| 2014/0297116 A1 | 10/2014 | Anderson et al. |
| 2014/0306833 A1 | 10/2014 | Ricci |
| 2014/0309789 A1 | 10/2014 | Ricci |
| 2014/0309806 A1 | 10/2014 | Ricci |
| 2014/0309864 A1 | 10/2014 | Ricci |
| 2014/0309891 A1 | 10/2014 | Ricci |
| 2014/0310186 A1 | 10/2014 | Ricci |
| 2014/0316671 A1 | 10/2014 | Okamoto |
| 2014/0324268 A1 | 10/2014 | Montemerlo et al. |
| 2014/0330479 A1 | 11/2014 | Dolgov |
| 2014/0358331 A1 | 12/2014 | Prada Gomez et al. |
| 2014/0358353 A1 | 12/2014 | Ibanez-Guzman et al. |
| 2015/0006005 A1 | 1/2015 | Yu et al. |
| 2015/0006014 A1 | 1/2015 | Wimmer et al. |
| 2015/0026092 A1 | 1/2015 | Abboud et al. |
| 2015/0035685 A1 | 2/2015 | Strickland et al. |
| 2015/0051778 A1 | 2/2015 | Mueller |
| 2015/0057891 A1 | 2/2015 | Mudalige et al. |
| 2015/0062340 A1 | 3/2015 | Datta et al. |
| 2015/0062469 A1 | 3/2015 | Fleury |
| 2015/0066282 A1 | 3/2015 | Yopp |
| 2015/0066284 A1 | 3/2015 | Yopp |
| 2015/0070178 A1 | 3/2015 | Kline |
| 2015/0088358 A1 | 3/2015 | Yopp |
| 2015/0095190 A1 | 4/2015 | Hammad et al. |
| 2015/0097866 A1 | 4/2015 | Mochizuki |
| 2015/0120331 A1 | 4/2015 | Russo et al. |
| 2015/0134178 A1 | 5/2015 | Minoiu-Enache |
| 2015/0137985 A1 | 5/2015 | Zafiroglu et al. |
| 2015/0141043 A1 | 5/2015 | Abramson |
| 2015/0149018 A1 | 5/2015 | Attard et al. |
| 2015/0149021 A1 | 5/2015 | Duncan et al. |
| 2015/0160019 A1 | 6/2015 | Biswal et al. |
| 2015/0166059 A1 | 6/2015 | Ko |
| 2015/0170287 A1 | 6/2015 | Tirone |
| 2015/0187019 A1 | 7/2015 | Fernandes |
| 2015/0193731 A1* | 7/2015 | Stevens ............ G06Q 10/083 705/26.7 |
| 2015/0196256 A1 | 7/2015 | Venkatraman et al. |
| 2015/0210280 A1 | 7/2015 | Agnew et al. |
| 2015/0232065 A1 | 8/2015 | Ricci et al. |
| 2015/0235480 A1 | 8/2015 | Cudak |
| 2015/0235557 A1 | 8/2015 | Engelman |
| 2015/0242953 A1 | 8/2015 | Suiter |
| 2015/0248689 A1 | 9/2015 | Paul et al. |
| 2015/0269536 A1* | 9/2015 | Parris ............ G06Q 10/30 705/26.3 |
| 2015/0293994 A1 | 10/2015 | Kelly |
| 2015/0338226 A1 | 11/2015 | Mason et al. |
| 2015/0339639 A1* | 11/2015 | Choe ............ G06Q 20/10 705/39 |
| 2015/0348112 A1 | 12/2015 | Ramanujam et al. |
| 2016/0001781 A1 | 1/2016 | Fung et al. |
| 2016/0026182 A1* | 1/2016 | Boroditsky ........... H04L 67/306 701/23 |
| 2016/0063761 A1 | 3/2016 | Sisbot et al. |
| 2016/0075512 A1 | 3/2016 | Lert, Jr. |
| 2016/0078695 A1 | 3/2016 | McClintic et al. |
| 2016/0078758 A1 | 3/2016 | Basalamah |
| 2016/0090100 A1 | 3/2016 | Oyama et al. |
| 2016/0139594 A1 | 5/2016 | Okumura et al. |
| 2016/0140507 A1 | 5/2016 | Stevens et al. |
| 2016/0176409 A1 | 6/2016 | Kirsch et al. |
| 2016/0187150 A1 | 6/2016 | Sherman et al. |
| 2016/0202700 A1 | 7/2016 | Sprigg |
| 2016/0205146 A1 | 7/2016 | Sugioka et al. |
| 2016/0221768 A1* | 8/2016 | Kadaba ............. B65G 67/04 |
| 2016/0239798 A1* | 8/2016 | Borley ............. G06Q 10/0833 |
| 2016/0303969 A1 | 10/2016 | Akula |
| 2016/0304122 A1 | 10/2016 | Herzog et al. |
| 2016/0334797 A1 | 11/2016 | Ross et al. |
| 2016/0344737 A1 | 11/2016 | Anton |
| 2016/0355192 A1 | 12/2016 | James et al. |
| 2016/0358477 A1 | 12/2016 | Ansari |
| 2016/0364823 A1 | 12/2016 | Cao |
| 2016/0368534 A1 | 12/2016 | Harda |
| 2016/0371977 A1 | 12/2016 | Wingate |
| 2016/0375862 A1* | 12/2016 | Ito ............. B60R 25/1004 348/148 |
| 2017/0001650 A1 | 1/2017 | Park |
| 2017/0010613 A1 | 1/2017 | Fukumoto |
| 2017/0021830 A1 | 1/2017 | Feldman et al. |
| 2017/0021837 A1 | 1/2017 | Ebina |
| 2017/0032585 A1* | 2/2017 | Stenneth ............ G07C 5/008 |
| 2017/0057542 A1 | 3/2017 | Kim et al. |
| 2017/0061798 A1 | 3/2017 | Linder |
| 2017/0088143 A1 | 3/2017 | Goldman-Shenhar et al. |
| 2017/0106876 A1 | 4/2017 | Gordon et al. |
| 2017/0123428 A1 | 5/2017 | Levinson et al. |
| 2017/0129335 A1 | 5/2017 | Lu |
| 2017/0129487 A1 | 5/2017 | Wulf |
| 2017/0137023 A1 | 5/2017 | Anderson et al. |
| 2017/0151958 A1 | 6/2017 | Sakuma |
| 2017/0168689 A1 | 6/2017 | Goldman-Shenhar et al. |
| 2017/0200449 A1 | 7/2017 | Penilla et al. |
| 2017/0217276 A1* | 8/2017 | Banvait ............ B60G 17/0162 |
| 2017/0219364 A1 | 8/2017 | Lathrop |
| 2017/0248949 A1 | 8/2017 | Moran et al. |
| 2017/0300855 A1* | 10/2017 | Lund ............. B64C 39/024 |
| 2018/0032071 A1 | 2/2018 | Wieneke |
| 2018/0072323 A1 | 3/2018 | Gordon |
| 2018/0075309 A1 | 3/2018 | Sathyanarayana et al. |
| 2018/0086373 A1 | 3/2018 | Tamura |
| 2018/0093631 A1 | 4/2018 | Lee et al. |
| 2018/0108369 A1 | 4/2018 | Gross |
| 2018/0141453 A1 | 5/2018 | High |
| 2018/0154906 A1 | 6/2018 | Dudar |
| 2018/0203455 A1 | 7/2018 | Cronin |
| 2018/0265054 A1 | 9/2018 | Hofmann |
| 2018/0371805 A1 | 12/2018 | Ichinose |

FOREIGN PATENT DOCUMENTS

| | | |
|---|---|---|
| CN | 2349068 Y | 11/1999 |
| CN | 201004265 Y | 1/2008 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 0582236 | 2/1994 |
| GB | 2498793 A | 7/2013 |
| WO | 2014058263 | 4/2014 |
| WO | 2014066721 A2 | 5/2014 |
| WO | 2014147361 | 9/2014 |
| WO | 2014148975 | 9/2014 |
| WO | 2014148976 | 9/2014 |
| WO | 2015024616 | 2/2015 |
| WO | 2015056105 | 4/2015 |

OTHER PUBLICATIONS

Anonymous, 'System and Method to Target Advertisements for the Right Focus Group'. ip.com, No. 000218285, May 31, 2012, pp. 1-2.

Anonymous, "Car Built-In Mechanism to Enforce Mandatory Self-Driving Mode", ip.com, No. 000234916, Feb. 14, 2014, pp. 1-3.

(56) References Cited

OTHER PUBLICATIONS

T. Horberry et al., "Driver Distraction: the Effects of Concurrent in-Vehicle Tasks, Road Enviornment Complexity and Age on Driving Performance", Elsevier Ltd., Accident Analysis and Prevention, 38, 2006, pp. 185-191.

J. Miller, "Self-Driving Car Technology's Benefits, Potential Risks, and Solutions", the Energy Collective, theenergycollective.com, Aug. 19, 2014, pp. 1-7.

Chen S, et al., "A Crash Risk Assessment Model for ROAS Curves". Inproceedings 20th International Technical Conference on the Enhanced Saftey of Vehicles., 2007. Lyon, France.

J. Wei et al., "Towards a Viable Autonomous Driving Research Platform", IEEE, Intelligent Vehicles Symposium (IV), 2013, pp. 1-8.

Anonymous, "Diagnostics Mechanism for Self-Driving Cars to Validate Self-Driving Capabilities", ip.com, Jun. 6, 2014, pp. 1-5. ip.com.

Brownell, "Shared Autonomous Taxi Networks: an Analysis of Transportation Demand in NJ and a 21st Century Solution for Congestion", Dissertation, Princeton University, 2013, pp. 1-122.

Sessa et al., "Blueprint of Alternative City Cyber-Mobility Take-U Scenarios", Seventh Framework Programme Theme SST.2012.3.1-4, Automated Urban Vehicles Collaborative Project—Grant Agreement No. 314190, 2013, pp. 1-63.

Lutin et al., "The Revolutionary Development of Self-Driving Vehicles and Implications for the Transportation Engineering Profession", ITE Journal 83.7, 2013, pp. 28-32.

A. Hars, "Self-Driving Cars: the Digital Transformation of Mobility", Marktplatze Im Umbruch, Springer Berlin Heidelberg, 2015, pp. 539-549.

Jimenez et al.; "Autonomous collision avoidance system based on accurate knowledge of the vehicle surroundings"; Inst Engineering Technology—IET; IET Intelligent Transport Systems vol. 9, No. 1, pp. 105-117; 2015; England.

Anonymous, "Avoiding Crashes With Self-Driving Cars: Today's Crash-Avoidance Systems are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.

Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/GOOGLE-FILES-PATENT-FOR-SECOND-GEN-AUTONOMOUS-VEHICLE-WITHOUT-A-STEERING-WHEEL-BRAKE-PEDAL-MORE.HTML>.

P. Mell et al., "The NIST Definition of Cloud Computing", National Institute of Standards and Technology, Information Technology Laboratory, Sep. 2011, pp. 1-7.

Anonymous, "Schedule a Charity Donation Pick Up—Donationtown", donationtown.org, Retrieved Sep. 14, 2016, pp. 1-3.

The Salvation Army, "The Salvation Army Family Stores—Home", satruck.org, Retrieved Sep. 14, 2016, pp. 1-4.

C. Berger et al., "COTS-Architecture With a Real-Time OS for a Self-Driving Miniature Vehicle", Safecomp 2013—Workshop ASCOMS of the 32nd International Conference on Computer Safety, Reliability and Security, Sep. 2013, Toulouse, France, pp. 1-13.

* cited by examiner

CONFIGURING A SELF-DRIVING VEHICLE FOR CHARITABLE DONATIONS PICKUP AND DELIVERY

BACKGROUND

The present invention relates to the field of vehicles, and specifically to the field of self-driving vehicles. Still more specifically, the present invention relates to the field of using self-driving vehicles to pick up and deliver charitable donations.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

In embodiments of the present invention, a system, method and/or computer program product configures and maneuvers a self-driving vehicle based on a charitable item to be transported and a risk analysis of transporting that charitable item. One or more processors receive a first message indicating that a donor has a charitable item available for pickup from a pickup location, and a second message indicating that a recipient at a delivery location has a need for the charitable item. The processor(s) match the charitable item to a self-driving vehicle (SDV) that is configurable to transport the charitable item from the pickup location to the delivery location. The processor(s) perform a risk analysis for transporting the charitable item from the pickup location to the delivery location, where the risk analysis compares a level of the need for the charitable item to a risk to the charitable item and the SDV when transporting the charitable item to the delivery location. In response to the risk analysis concluding that the level of the need for the charitable item is greater than the risk to the charitable item and the SDV when transporting the charitable item to the delivery location, the processor(s) modify one or more physical components of the SDV to transport the charitable item from the pickup location to the delivery location, and then direct the SDV to transport the charitable item from the pickup location to the delivery location.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
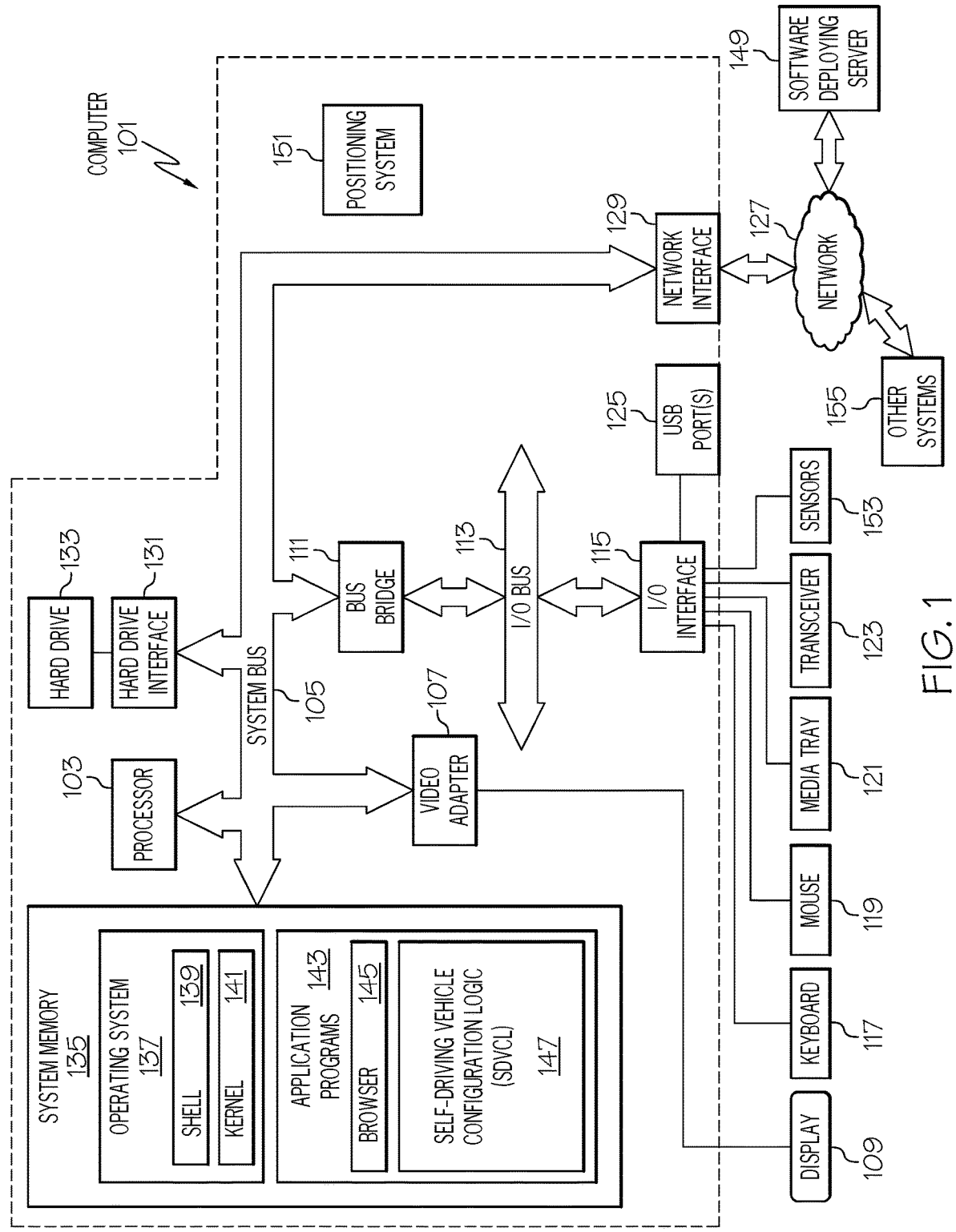
FIG. 1 depicts an exemplary system and network in which the present invention may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be implemented within software deploying server 149 and/or other systems 155 shown in FIG. 1, and/or supervisory computer 201 shown in FIG. 2, and/or a self-driving vehicle (SDV) on-board computer 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109 (which may be a touch screen capable of receiving touch inputs), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a speaker 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

Figure 2:
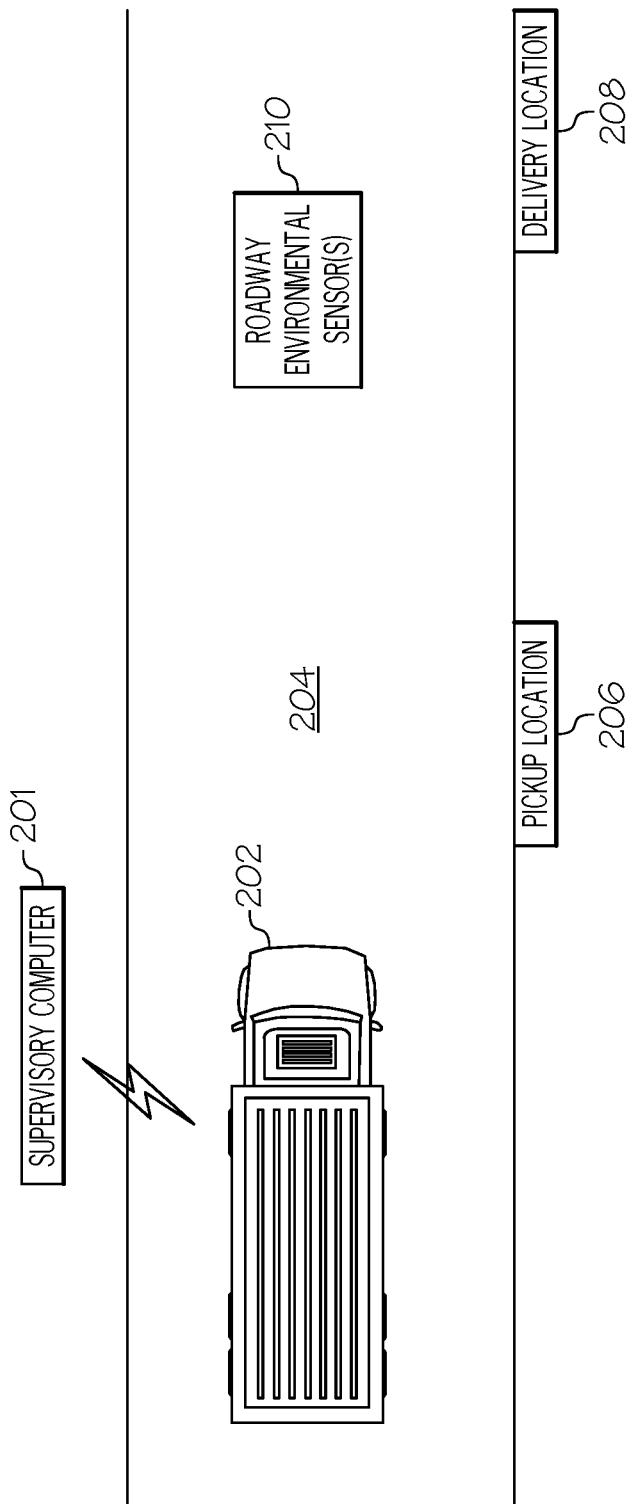
FIG. 2 illustrates an exemplary self-driving vehicle (SDV) picking up and delivering charitable contributions in accordance with one or more embodiments of the present invention.

As depicted, computer 101 is able to communicate with a software deploying server 149 and/or other systems 155 (e.g., establishing communication between supervisory computer 201 and SDV 202 shown in FIG. 2) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Self-Driving Vehicle Configuration Logic (SDVCL) 147. SDVCL 147 includes code for implementing the processes described below, including those described in FIGS. 2-5. In one embodiment, computer 101 is able to download SDVCL 147 from software deploying server 149, including in an on-demand basis, wherein the code in SDVCL 147 is not downloaded until needed for execution. In one embodiment of the present invention, software deploying server 149 performs all of the functions associated with the present invention (including execution of SDVCL 147), thus freeing computer 101 from having to use its own internal computing resources to execute SDVCL 147.

Also within computer 101 is a positioning system 151, which determines a real-time current location of computer 101 (particularly when part of a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101 and/or the state of occupants of a self-driving vehicle (SDV). More specifically, when detecting the environment of the SDV, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, microphones (e.g., microphone 331 shown in FIG. 3), light sensors such as light sensor 329 shown in FIG. 3 for detecting how dark a roadway is, chemical sensors for detecting chemical spills on a roadway, moisture detectors, etc. that detect ambient weather conditions, traffic conditions (as detected by the cameras, microphones, etc.), and other environmental conditions of a roadway upon which the SDV is traveling.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

With reference now to FIG. 2, an exemplary self-driving vehicle (SDV) 202 is depicted traveling along a roadway 204. Assume now that SDV 202 has been tasked by supervisory computer 201 to pick up a charitable donation (i.e., a physical object such as clothes, an appliance, a vehicle, etc.) from pickup location 206 and deliver to a delivery location 208. For example, pickup location 206 may be the home of a donor (as detected by supervisory computer 201 from an email, posting to social media, etc.) who wishes to donate a used (but operational) refrigerator. Assume further that supervisory computer 201 has received a message (e.g., via an e-mail, posting on social media, etc.) from a person at the delivery location 208 (e.g., another home) stating that they are in need of a refrigerator, but cannot afford to pay for it. As such, supervisory computer 201 will direct the SDV 202 to pickup the refrigerator from pickup location 206 and deliver it to delivery location 208.

In accordance with one or more embodiments of the present invention described herein, before taking the refrigerator from pickup location 206 to delivery location 208, an analysis is performed by supervisory computer 201 and/or SDV 202 to determine 1) the features of the charitable contribution (e.g., the size and weight of the refrigerator), 2) how the delivery of the donation (e.g., a refrigerator) is affected by conditions of roadway 204, and 3) the capacity/state of the SDV 202.

For example, the size and weight of the refrigerator may be supplied by the donor, or may be ascertained by a scale, camera, etc. on the SDV 202, and/or may be determined by an analysis of a model number and/or serial number of the donated item.

The condition of the roadway 204 and its environment may be detected by roadway environmental sensor(s) 210 (e.g., sensors that detect how dark roadway 204 is, whether it is raining at the delivery location 208, how rough (e.g., potholes) the roadway 204 is between pickup location 206 and delivery location 208, if the roadway 204 is flooded, if there are fires in the area, etc.).

The capacity/state of the SDV 202 may be based on a capacity of a lifting mechanism on the SDV 202 to lift the refrigerator, whether or not there are lockable storage compartments on the SDV 202, whether or not the SDV has adjustable load levelers and/or shock absorbers on its frame that can be adjusted to transport the refrigerator without damaging it, whether there is room in the SDV 202 for the item (e.g., the refrigerator), etc.

Once the 1) features of the donation, 2) roadway conditions, and 3) state of the SDV are determined, the SDV 202 is configured accordingly and/or an optimal route is developed for traveling between pickup location 206 and delivery location 208.

Figure 3:
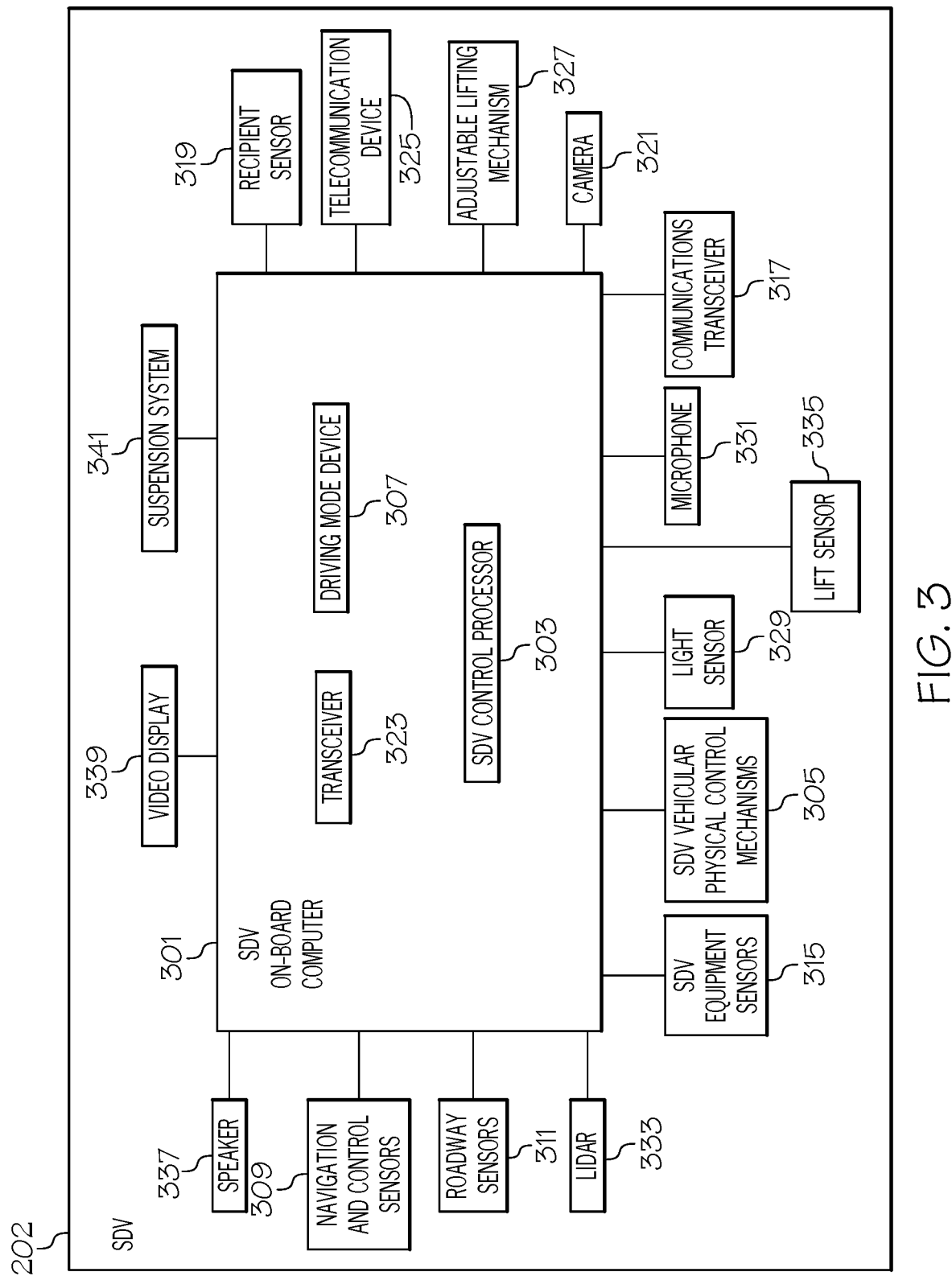
FIG. 3 depicts additional exemplary detail within an SDV in accordance with one or more embodiments of the present invention.

With reference now to FIG. 3, additional details of one or more embodiments of the SDV 202 are presented.

As shown in FIG. 3, SDV 202 has an SDV on-board computer 301 that controls operations of the SDV 202. According to directives from a driving mode device 307, the SDV 202 can be selectively operated in manual mode or autonomous mode. In some embodiments, driving mode device 307 is a dedicated hardware device that selectively directs the SDV on-board computer 301 to operate the SDV 202 in one of the autonomous modes or in the manual mode.

While in autonomous mode, SDV 202 operates without the input of a human driver, such that the engine, steering mechanism, braking system, horn, signals, etc. are controlled by the SDV control processor 303, which is now under the control of the SDV on-board computer 301. That is, by the SDV on-board computer 301 processing inputs taken from navigation and control sensors 309 and the driving mode device 307 (indicating that the SDV 202 is to be controlled autonomously), then driver inputs to the SDV control processor 303 and/or SDV vehicular physical control mechanisms 305 are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure acceleration of a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). An exemplary positioning system within SDV 202 is a Light Detection and Ranging (LIDAR) (e.g., LIDAR 333 shown in FIG. 3) or Laser Detection and Ranging (LADAR) system that measures the time it takes to receive back the emitted electromagnetic radiation (e.g., light), and/or evaluating a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301. In one or more embodiments, different SDVs are able to directly communicate with one another in order to let one another know their relative positions. That is, a first SDV may transmit its GPS coordinates to a second SDV (and vice versa), thus allowing the first SDV and the second SDV to know the current real-time GPS-coordinate location of the other SDV.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 311 that are coupled to the SDV 202. Roadway sensors 311 may include sensors that are able to detect the amount of water, snow, ice, etc. on the roadway 204 (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway 204 is using light sensors.

In one or more embodiments of the present invention, a camera 321 can be movably trained on roadway 204, in order to provide photographic images of conditions on the roadway 204 upon which the SDV 202 is traveling. In one or more embodiments of the present invention, the camera 321 will compare real-time images of roadway 204 with past images of roadway 204, in order to determine any changes to the condition of the roadway 204.

In one or more embodiments of the present invention, camera 321 can also be trained on cargo during loading, transporting, and unloading. That is, camera 321 can take a video of charitable donations as they are loaded onto the SDV 202 at pickup location 206 shown in FIG. 2, while they are in transit along roadway 204, and while they are being unloaded at delivery location 208, thus providing a continuous record of the movement of the charitable donations.

In one or more embodiments of the present invention, camera 321 can be trained on a location (e.g., pickup location 206 or delivery location 208 shown in FIG. 2) and/or a person (e.g., a donor of the charitable donation and/or the recipient of the chartable donation) while the charitable donation is being picked up and/or delivered. This not only provides a record of the charitable donation being picked up and delivered (for proof of donation), but may also (with the recipient's permission) allow the donor to see the reaction of the recipient to receiving the charitable donation.

Figure 4:
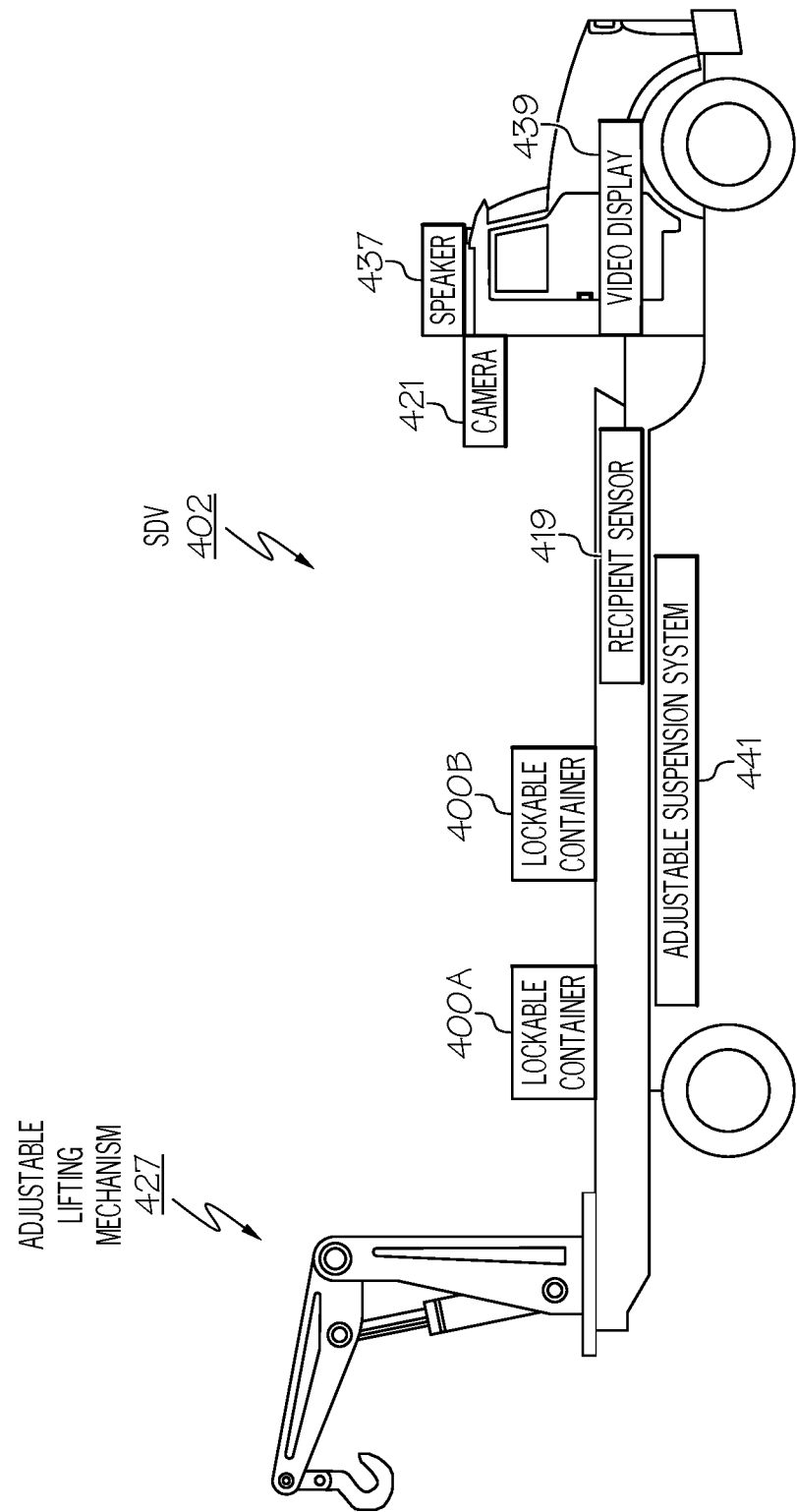
FIG. 4 illustrates additional detail of an exemplary SDV in accordance with one or more embodiments of the present invention.

Similarly, a recipient sensor 319 (e.g., a motion detector) that is capable of detecting the presence of persons at pickup location 206 and/or delivery location 208 may be coupled to SDV 202. Recipient sensor 319 is depicted in FIG. 4 as recipient sensor 419.

In one or more embodiments of the present invention, also within the SDV 202 are SDV equipment sensors 315. SDV equipment sensors 315 may include cameras aimed at tires on the SDV 202 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc. Thus, in one or more embodiments of the present invention, if the SDV 202 is suffering from a certain deficiency such as having tires with little tread remaining, then the supervisory computer 201 may prevent the SDV 202 from picking up a fragile charitable donation (e.g., a chandelier that may break if the SDV 202 suffers a blowout). Similarly, if the SDV equipment sensors detect that the engine is overheating and the SDV 202 is likely to be delayed when traveling from pickup location 206 to delivery location 208, then the supervisory computer 201 may prevent the SDV 202 from picking up a perishable charitable donation (e.g., a donation of medicine that cannot be exposed to heat for more than two hours) from pickup location 206 for delivery to location 208.

In one or more embodiments of the present invention, also within SDV 202 is a communications transceiver 317, which is able to receive and transmit electronic communication signals (e.g., RF messages) from and to other communications transceivers found in other vehicles, servers, supervisory computers, etc.

In one or more embodiments of the present invention, also within SDV 202 is a telecommunication device 325 (e.g., a smart phone, a cell phone, a laptop computer, etc.), which may be connected (e.g., via a near field communication—NFC connection) to the SDV on-board computer 301.

In one or more embodiments of the present invention, also within SDV 202 is a speaker 337 (depicted in FIG. 4 as speaker 437), which is able to broadcast arrival notices (e.g., a synthesized voice alert) that lets donors at pickup location 206 and/or donation recipients at delivery location 208 know that SDV 202 has arrived at their respective locations. In an embodiment of the present invention, the arrival of the SDV 202 is announced by the communications transceiver 317 shown in FIG. 3 sending a text message (or a similar telecommunication message) to a smartphone of a donor at the pickup location 206 or a donee at the delivery location 208.

In one or more embodiments of the present invention, also attached to the SDV 202 is a video display 339 (depicted in FIG. 4 as video display 439 mounted on the side of SDV 402), which is able to display arrival notices (e.g., a text message board, flashing light, etc.) that lets donors at pickup location 206 and/or donation recipients at delivery location 208 know that SDV 202 has arrived at their respective locations. In an embodiment of the present invention, the video display 439 displays a message regarding how the donated item will be loaded or unloaded. For example, assume that the donated item is a refrigerator. The video display 439 may display a text or video file, describing (or displaying) how the refrigerator will be loaded (e.g., by the adjustable lifting mechanism 427 shown in FIG. 4) onto the SDV 402, thus alerting the donor to stay clear of the SDV 402 in order to avoid being injured, etc. Similarly, when the refrigerator arrives at the delivery location 208, a video will be displayed on the video display 439 showing the donee how the refrigerator is going to be unloaded (e.g., by the adjustable lifting mechanism 427 shown in FIG. 4).

In one or more embodiments of the present invention, an adjustable suspension system 341 is in electrical communication with SDV on-board computer 301. Adjustable suspension system 341 includes, but is not limited to, adjustable (e.g., pneumatic) shock absorbers, torsion bars, etc. that can be dynamically adjusted by activating pneumatic pumps, actuators, electromechanical gears, etc. to adjust the ride of the SDV 402. That is, by adjusting the adjusting suspension system 441 (analogous to adjustable suspension system 341 in FIG. 3), the charitable items being transported by SDV 402 (e.g., within the lockable containers 400a-400b shown in FIG. 4) can receive less road vibration (but at the cost of less responsive control of the SDV), in order to protect fragile charitable items during transport.

In one or more embodiments of the present invention, an adjustable lifting mechanism 327 is in electrical communication with SDV on-board computer 301 within SDV 302. Adjustable lifting mechanism 327 is a device that is capable of loading, positioning, and unloading items, such as the charitable items described herein, onto the SDV 202.

In order to optimize the SDV 202 in its configuration and usage, one or more embodiments of the present invention utilize: 1) an SDV capable of transporting charitable items for distribution; 2) a device for loading the charitable items on the SDV in a manner that is specifically configured for the type of charitable item being loaded/transported/unloaded; 3) an alerting device for signaling when the SDV is at the pickup and/or delivery locations; 4) a needs-matching computer configured to match the charitable items with those persons in need of the charitable items; and 5) a risk-management logic device that computes a risk associated with conveying the charitable item to the recipient who needs the charitable item, such that the operation and configuration of the SDV 202 is optimized for delivering the charitable item to the recipient.

A charitable item is defined as a physical object that is donated from a donor to a charitable recipient at no charge to the charitable recipient. In accordance with one or more embodiments of the present invention, such charitable transactions are facilitated by a charitable (e.g., a non-profit) organization, which matches resources (donors) to need (recipients) and then coordinates pickup of the item from the donor with delivery of the item to the recipient. More specifically, the pickup and delivery process is performed by a self-driving vehicle (SDV), which can be selectively configured according to the route of the delivery, the state/features of the donated item, the pickup and delivery locations, needs of the recipient, etc.

Often, individuals would like to donate items for charity (e.g., clothes, furniture, books, shoes, appliances, mattress, toys, electronics, tools, non-perishable food items, etc.) but find it difficult to bring the items to a deposit point for a charity (and people may discard the item as a result).

In one or more embodiments of the present invention, the SDV may facilitate the generation of write-off forms or other "paperwork" (e.g., receipts, filing reports, etc.) related to the charitable donation. For example, as soon as the SDV picks up the charitable donation, one or more processors (e.g., within supervisory computer 201 shown in FIG. 2 and/or SDV on-board computer 301 shown in FIG. 3) may generate a receipt, a deduction form for a governmental agency, a photograph of the charitable donation, etc. for the use of the donor to prove that the donation occurred.

In one or more embodiments of the present invention, the SDV will video-record one or more aspects of the item transaction from donor to recipient. For example, consider SDV 402 (analogous to SDV 202 shown in FIG. 2) shown in FIG. 4. As depicted, a camera 421 (analogous to camera 321 described in FIG. 3) on SDV 402 is capable of videotaping charitable items as they are transported (e.g., from pickup location 206 to delivery location 208 shown in FIG. 2) while on the bed of the SDV 402, thus proving that the charitable items were in fact picked up and delivered from pickup location 206 to delivery location 208.

In one or more embodiments of the present invention, images captured by camera 421 of the charitable item being picked up are used 1) to determine the value of the charitable item, and 2) to determine whether or not the charitable item meets the needs of the person requesting the charitable item. For example, assume that the charitable item is a sofa. The camera 421 captures an image of the sofa (while at the pickup location 206), and then one or more processors processes the captured image to determine one or more conditions, e.g., the color, shape, size, state of repair ("wear and tear"), etc. of the sofa. If the condition of the sofa does not meet the need of the person requesting the sofa (e.g., the sofa is in too great a state of disrepair), then the SDV 202 will be blocked from picking up the sofa at the pickup location 206.

In one or more embodiments of the present invention, the camera 421 on the SDV 202 will aid the users in determining the value of clothing, electronics, or furniture, etc. based on photos taken by the camera 421, thus determining the "fair market value" of the charitable/donated item at the time of the donation.

In one or more embodiments of the present invention, SDV 402 shown in FIG. 4 includes an adjustable lifting mechanism 427 (analogous to adjustable lifting mechanism 327 shown in FIG. 3), which may be a crane (as depicted), a conveyor belt, a winch, or any other device capable of 1) loading charitable items onto the SDV 402 and 2) being adjustable by the SDV on-board computer 301 within SDV 402. That is, assume that adjustable lifting mechanism 427 is a crane. Based on photo images, information provided by the donor, etc. for the charitable item being transported, SDV 402 can determine how heavy that charitable item is, the size of the charitable item, how fragile the charitable item is, etc. Based on these factors, the crane will be adjusted in order to have enough power to lift the charitable item but at a speed that will not damage the charitable item (e.g., by the SDV on-board computer 301 directing the crane to activate certain gears).

In one or more embodiments of the present invention, the SDV 402 shown in FIG. 4 includes one or more lockable containers 400*a*-400*b*. Lockable containers 400*a*-400*b* have an electromechanical lock that is controlled by the SDV on-board computer 301 shown in FIG. 3. As described in one or more embodiments herein, if the SDV 402 is being attacked by a intruder (i.e., camera 421 detects an unauthorized person attempting to climb aboard SDV 402, then the SDV on-board computer 301 will automatically and selectively lock one or more of the lockable containers 400*a*-400*b*, in order to selectively protect the charitable items. That is, if lockable container 400*a* has valuable items contained therein (e.g., valuable consumer electronic devices), while lockable container 400*b* has less valuable items (e.g., canned goods), then lockable container 400*a* may be locked by SDV on-board computer 301, while lockable container 400*b* remains unlocked.

As described herein, both donors and recipients of the charitable items may let the supervisory computer 201 and/or the SDV on-board computer 301 know that they have (donor) or need (recipient) a particular charitable item (e.g., a used but operational refrigerator). This information may be conveyed by accessing a webpage sponsored by the charitable organization that oversees the supervisory computer 201 and/or SDV 202, or this information may be sent via an email, or this information may be supplied to a social network website (which is monitored by the charitable organization) from a phone, tablet, computer, etc. used by the donor/recipient.

The donor may be an individual, a for-profit-organization, a non-profit organization, etc. Similarly, the recipient may be an individual in need of a charitable item, or the recipient may be a charitable organization that is tasked with delivering the charitable item to the individual in need.

In one or more embodiments of the present invention, the SDV 202 uses a donor or recipient smartphone to log certain aspects of the transaction. For example, whenever the SDV 202 delivers a charitable item to delivery location 208 shown in FIG. 2, the presence of SDV 202 may be detected by the recipient's smartphone (e.g., by a near-field communication system in the recipient's smartphone), which then conveys to the supervisory computer 201 that the SDV 202 1) has arrived at the delivery location 208 and/or 2) has delivered the charitable item to the recipient.

In one or more embodiments of the present invention, if the charitable donation/item is in such a poor condition that it is of no use to the person who has requested it, then the SDV will be prevented from picking it up at the donor pickup location. For example, a camera on the SDV may capture a photographic image of a sofa that is being donated. If a risk analysis shows that the sofa is in such a bad state of disrepair as to be unusable, then the SDV will simply not accept it.

In one or more embodiments of the present invention, a further risk analysis will determine if the environment of the delivery location 208 shown in FIG. 2 is too unsafe for SDV 202 to make the delivery of the charitable item. That is, if the supervisory computer 201 and/or SDV 202 receive sensor readings from roadway environmental sensor(s) 210 indicating that the roadway in front of delivery location 208 is flooded, in the middle of a fire, etc., then the SDV 202 will either not deliver the charitable item to the delivery location 208 and/or will avoid the delivery location 208 altogether.

In one or more embodiments of the present invention, more than one SDV may have the same, similar, or complementary charitable item, and the SDV nearest the recipient drives to the recipient. For example, rather than SDV 202 in FIG. 2 having the only donated sofa on board, multiple other SDVs (not shown) may also have donated sofas. If all such sofas meet the needs of the person requesting a donated sofa, then the SDV closest to the requester at the time the request comes in will deliver the sofa that it has on board. That is, while in one embodiment the SDV 202 will only pick up a donated item if there is a present known need (for a particular person or other entity) for that donated item, in one embodiment donated items are loaded onto SDVs even if there is not an immediate match. Once the match occurs, then the SDV having the requested item that is closest to the requester (at the delivery location 208) will be dispatched to the delivery location 208.

In one or more embodiments of the present invention, the willingness of a donor to donate the charitable item and/or the need of a person for the charitable item may be found on a social network webpage. For example, a social networking application may be used to retrieve information regarding the standing of a donor business, a donor individual, information on items, as well as recipient or donor feedback. In another example, an individual of a social network might inform peers in the same social network regarding what items were donated, which may encourage similar donations from the other individuals.

In one or more embodiments of the present invention, the supervisory computer 201 and/or SDV 202 shown in FIG. 2 provide geographic filtering, such that donors who are geographically near potential recipients of the charitable items are matched to one another, thus reducing travel time by the SDV 202 when transporting the charitable items.

In one or more embodiments of the present invention, the supervisory computer 201 and/or SDV 202 shown in FIG. 2 generates "cause profiles" for potential donors. For example, supervisory computer 201 may have a record of a person living at pickup location 206 that states that this person is interested in supporting veterans. The record may also include that this person has a used sofa and refrigerator that he/she is willing to donate to a veteran, but nobody else. Thus, when a request for a used sofa or refrigerator comes in from a veteran (as identified by his/her personal profile), then supervisory computer 201 will send a message to the donor, asking him/her to put his/her used sofa/refrigerator outside for pickup the next day.

In some cases, the system can offer a web based system to help capture information related to the items for charitable donation, and will then assign one charitable organization or recipient or housing complex to receive a benefit of the donated item.

In one or more embodiments of the present invention, the SDV 202 enters into a "lockdown" or "emergency mode" if it comes under attack (e.g., someone is trying to steal items from the SDV).

In one or more embodiments of the present invention, the SDV 202 learns how to improve matching donors to recipients, delivering times, and pickup times based on factors that include feedback, a logging of time spent driving, a logging of time spent stopping at a location, a logging of illicit activities, etc.

In one or more embodiments of the present invention, supervisory computer 201 and/or SDV 202 shown in FIG. 2 create a map, showing which geographic areas have been the most "generous" in supplying donated items to the SDV.

Ecological ramifications of the present invention include reducing the amount of solid waste as a result of recycling used goods to needy recipients. Thus, the supervisory computer 201 and/or SDV 202 shown in FIG. 2 may create a log of the weight, volume, or nature of materials donated and delivered to recipients so that the reduction in the amount of material sent to a disposal site is calculated and broadcast.

Figure 5:
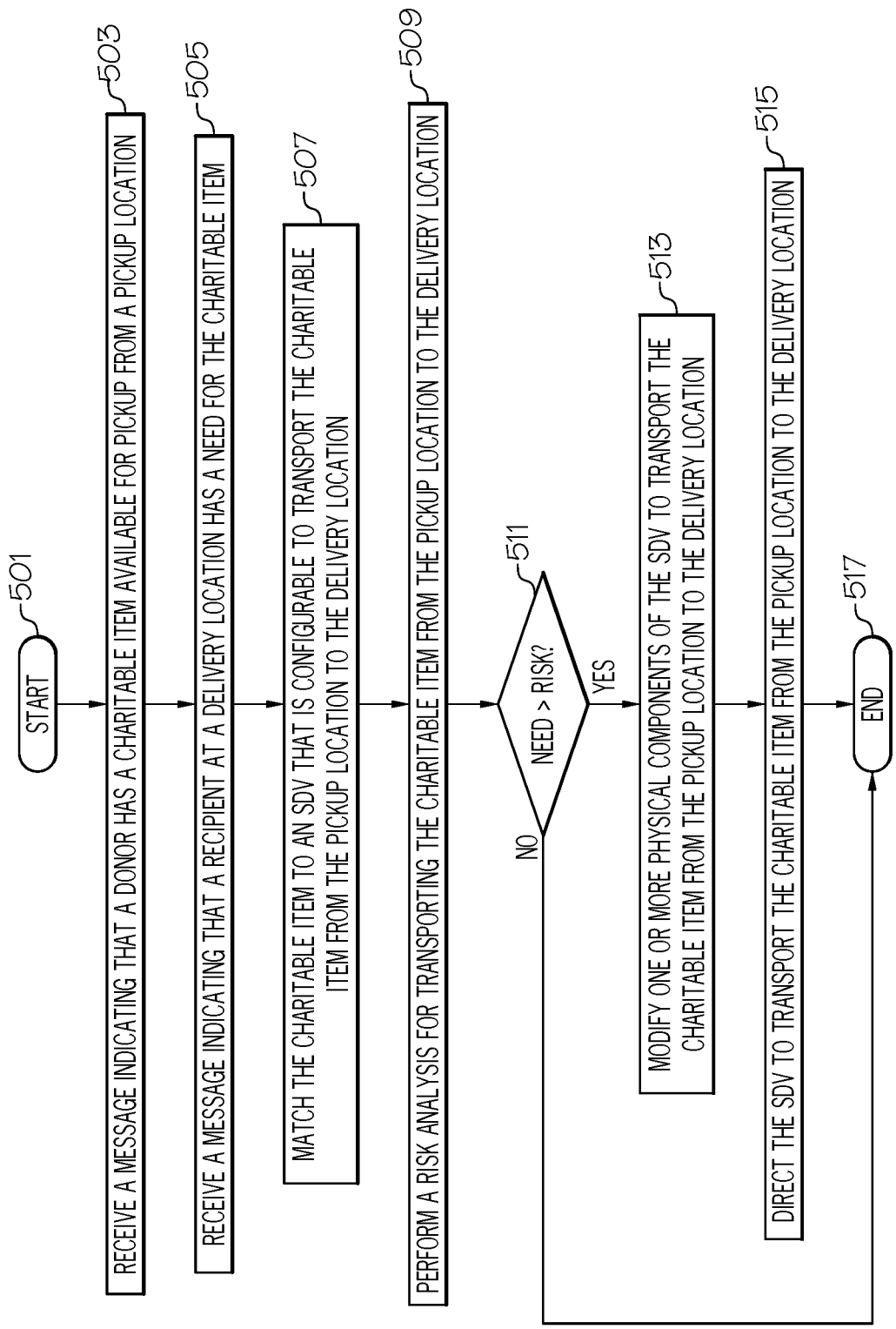
FIG. 5 is a high-level flow chart of one or more steps performed by an SDV to pick up and deliver charitable contributions in accordance with one or more embodiments of the present invention.

With reference now to FIG. 5, a high-level flow chart of one or more steps performed by an SDV to pick up and deliver charitable contributions in accordance with one or more embodiments of the present invention is presented.

After initiator block 501, one or more processors (e.g., within supervisory computer 201 shown in FIG. 2 and/or SDV on-board computer 301 shown in FIG. 3) receive a message (e.g., from a smartphone used by a donor at pickup location 206 shown in FIG. 2) indicating that the donor has a charitable item available for pickup from the pickup location, as described in block 503.

As described in block 505, the processor(s) then receive a message indicating that a recipient (i.e., a requester of and thus a potential recipient of the charitable item) at a delivery location (e.g., delivery location 208 shown in FIG. 2) has a need for the charitable item.

As described in block 507, the processor(s) then match the charitable item to a self-driving vehicle (SDV) (e.g., SDV 202 shown in FIG. 2) that is configurable to transport the charitable item from the pickup location to the delivery location.

As described in block 509, the processor(s) then perform a risk analysis for transporting the charitable item from the pickup location to the delivery location. This risk analysis compares a level of the need for the charitable item to a risk to the charitable item and the SDV when transporting the charitable item to the delivery location. For example, if the charitable item is a sofa and there is a fire surrounding the delivery location 208 shown in FIG. 2, then the risk analysis would conclude that it is too risky to try to deliver the sofa to the requester at this time. However, if the charitable item is critically needed medicine and the roadway 204 near the delivery location 208 has pockets of high water (that are passable but pose a moderate risk to the SDV 202), then the risk analysis would conclude that the SDV 202 should attempt to deliver the critically needed medicine.

As described in query block 511, a query is made as to whether or not the risk analysis determines that the level of the need for the charitable item is greater than the risk to the charitable item and the SDV when transporting the charitable item to the delivery location. If so (block 513), then the processor(s) modify one or more physical components of the SDV to transport the charitable item from the pickup location to the delivery location.

For example, SDV on-board computer 301 may autonomously adjust a suspension of the SDV. Consider adjustable suspension system 441 shown in FIG. 4. Adjustable suspension system 441 is made up of pneumatic shock absorbers, torsion bars, etc. that are adjustable by the SDV on-board computer 301 within SDV 402. For example, assume that adjustable suspension system 441 is made up of pneumatic shock absorbers. SDV on-board computer 301 can send a signal to the pneumatic pump that pressurizes the pneumatic shock absorbers to increase the pressure to the pneumatic shock absorbers, in order to create a "firmer" ride that gives the SDV 402 better traction control, but results in a "rougher" ride for cargo (e.g., charitable items within one or more of the lockable containers 400a-400b) being transported by the SDV 402. Similarly, SDV on-board computer 301 can send a signal to an electromechanical valve that releases pressure in the pneumatic shock absorbers to decrease the pressure to the pneumatic shock absorbers, in order to create a "softer" ride for cargo (e.g., charitable items within one or more of the lockable containers 400a-400b) being transported by the SDV 402 (thus decreasing the risk of damage to fragile cargo), although at the expense of giving the SDV 402 worse traction control. Thus, the SDV on-board computer 301 will perform a risk analysis in order to find the optimal setting for the adjustable suspension system 441 based on 1) the fragility of the charitable items being transported by the SDV 402 and 2) current road conditions and other performance features of the SDV 402 (e.g., anti-lock brakes, tire condition, etc.) in order to provide a smooth and yet safe ride by the SDV 402.

In another example/embodiment of the present invention, the one or more physical components of the SDV 402 being modified is a device for loading the charitable items (e.g., into one or more of the lockable containers 400a-400b shown in FIG. 4). Such a device may be a powered ramp, a winch, a crane, etc. For example, consider the adjustable lifting mechanism 427 shown in FIG. 4 as a crane. Assume that this crane has multiple gear selections that provide variable levels of lifting capacity and speed for loading items into the lockable containers 400a-400b, and that the selection of the gears is made by sending a selection signal from the SDV on-board computer 301 within SDV 402. That is, SDV on-board computer 301 sends a signal to an electromechanical controller that positions gears within the crane (adjustable lifting mechanism 427) depicted in FIG. 4. If the charitable item being loaded into one or more of the lockable containers 400a-400b on the SDV 402 is very heavy (e.g., a refrigerator) or is very fragile (e.g., a chandelier), then the SDV on-board computer 301 will direct the crane to use a set of gears with a high ratio (i.e., a small input/power gear meshed with a large output gear that is coupled to a winch for lifting the cargo) in order to slowly load the cargo. However, if the charitable item being loaded onto the SDV 402 is very light (e.g., pillows) or is not fragile (e.g., books), then the SDV on-board computer 301 will direct the crane to use a set of gears with a low ratio (i.e., a large input/power gear meshed with a small output gear that is coupled to a winch for lifting the cargo) in order to quickly load the cargo.

In one embodiment, SDV 402 may utilize a lift sensor 335 to determine the gear position for adjustable lifting mechanism 427, according to the weight reported by lift sensor 335. In this embodiment, lift sensor 335 may use a strain gauge or other weight sensor to determine how heavy or light the cargo is, and the SDV on-board computer 301 will utilize this input to direct adjustable lifting mechanism 427 to lift slowly, in the case of heavy weight, or to lift more quickly in the case of lighter items.

Returning now to FIG. 5, the processor(s) then direct the SDV to transport the charitable item from the pickup location to the delivery location, as described in block 515. That is, the SDV on-board computer 301 will direct the SDV 402 to 1) load the chartable item onto the SDV 402 (e.g., into one or more of the lockable containers 400a-400b shown in FIG. 4) while at the pickup location 206 shown in FIG. 2, and then to 2) drive to the delivery location 208, where the charitable item will be offloaded.

The flow-chart ends at terminator block 517.

In an embodiment of the present invention, a video camera (e.g., camera 421 shown in FIG. 4) makes a video-recording of the charitable item while being transported from the pickup location to the delivery location. That is, the video camera will 1) record the charitable item being loaded onto the SDV 402 at the pickup location 206 shown in FIG. 2; 2) record the charitable item while it is traveling along (exemplary) roadway 204 from pickup location 206 to delivery location 208; and 3) record the charitable item while it is being offloaded at delivery location 208. This provides a continuous record of all stages of the transportation of the charitable item from the pickup location 206 to the delivery location 208, including loading, travel, and offloading.

In an embodiment of the present invention, the supervisory computer 201 shown in FIG. 2 receives a pickup message from a telecommunication device (e.g., a smartphone). The pickup message is from a donor of the charitable item to confirm to the supervisory computer that the SDV picked up the charitable item from the pickup location 206. For example, when the SDV 202 shown in FIG. 2 picks up the charitable item/contribution, the donor will send a message to the supervisory computer 201 (e.g., by entering information into a webpage hosted by the charitable organization that operates the SDV 202 for transporting charitable items), letting the computer/organization know that the SDV/organization now has possession of the donated item. This allows the organization to track down the donated item if it is lost, never arrives at delivery location 208, etc. In one or more embodiments, the message from the donor will include a description (e.g., a photograph) of the donated item, in order to allow the supervisory computer 201 to ensure that what was picked up at pickup location 206 was actually delivered to delivery location 208 (as confirmed by a photograph sent by the SDV 202 or the recipient when the donated item is offloaded at the delivery location 208).

In an embodiment of the present invention, a video camera (e.g., camera 421 shown in FIG. 4) captures an image of the charitable item at the pickup location 206 shown in FIG. 2. One or more processors (e.g., within supervisory computer 201 shown in FIG. 2 or within the SDV on-board computer 301 shown in FIG. 3) then analyze the image in order to determine a condition of the charitable item. That is, the processor(s) use photo-analysis software to determine the condition of the charitable item. For example, the processor(s) may compare a pixel map from the photo of the charitable item to be picked up with a pixel map of the same or similar type of item when new. If the color of the item shown in the two photographs is different beyond a predetermined range (due to fading), or the shape of the item shown in the two photographs is different beyond a predetermined range (e.g., due to broken components, fraying, etc.), then the processor(s) will determine that the item is no longer useful (i.e., the charitable item does not meet the need of the recipient for the charitable item), and will reject it from being pickup up by blocking a lifting mechanism on the SDV (e.g., the adjustable lifting mechanism 427 on the SDV 402 depicted in FIG. 4) from loading the charitable item onto the SDV at the pickup location.

In an embodiment of the present invention, one or more processors (e.g., within supervisory computer 201 and/or SDV on-board computer 301) extend the risk analysis (on whether or not to transport the charitable item from the pickup location to the delivery location) by factoring in an environment of the delivery location, where the environment includes a description of current safety factors for the delivery location, and where performing the risk analysis determines a safety level of the delivery location. In response to the further performing of the risk analysis determining that the safety level of the delivery location falls below a predetermined level, the processor(s) prevent the SDV from traveling to the delivery location.

For example, assume that the "environment of the delivery location" is that it is currently raining hard (i.e., at 3 inches per hour) at the delivery location 208. The processors will then assign a "safety level" to these conditions for this particular type of SDV 202, such as 1-5, where 1 is completely unsafe and 5 is completely safe. That is, assume that SDV 202 is a light utility truck. As such, driving in rain that is falling at 3 inches per hour may rate a safety rating of 2, due to the light utility truck's light weight, low ground clearance, etc. If the predetermined safety level for letting the SDV travel to the delivery location 208 is 3, then the SDV on-board computer 301 on this light utility truck will not drive the light utility truck to the delivery location 208. However, if the SDV 202 is a large heavy-duty truck (e.g., a heavy vehicle with high ground clearance, a large engine, etc.), then driving this heavy-duty truck through rain that is falling at 3 inches per hour may rate a safety rating of 4, due to the large heavy-duty truck's weight, high ground clearance, etc. As such, the SDV on-board computer 301 on this heavy-duty truck will drive the heavy-duty truck to the delivery location 208.

In an embodiment of the present invention, the charitable item (e.g., clothing, books, medicine, etc.) is transported on the SDV in a selectively lockable container (e.g., one or more of the lockable containers 400a-400b shown in FIG. 4), and one or more processors (e.g., within the supervisory computer 201 shown in FIG. 2 and/or within the SDV on-board computer 301 shown in FIG. 3) detect that the SDV is under attack from a intruder. In response to detecting the SDV is under attack from the intruder, the processor(s) send instructions to an electro-mechanical lock on the selectively lockable container to lock the selectively lockable container. For example, assume that the camera 421 detects an unauthorized person (e.g., whose image is not in a database of known donors, recipients, etc.) approaching the SDV 402. More specifically, the SDV on-board computer 301 in SDV 402 analyzes the photographic image captured, by the camera 421, and determines that the person in the photographic image is not authorized to approach the SDV 402. In order to protect the items within the lockable containers 400a-400b, the SDV on-board computer 301 sends a signal to an electro-mechanical lock on the selectively lockable container to lock the selectively lockable containers 400a-400b. This electro-mechanical lock may be any type or remotely controllable lock that, in response to receiving an electrical signal, causes the lock to engage. For example, the lock may be a bolt connected to an electromagnet. When power is supplied to the electromagnet, the bolt will slide into a sleeve, thus latching the lid to one or both of the lockable containers 400a-400b. The intruder is thus prevented from accessing the contents of the lockable containers 400a-400b.

In an embodiment of the present invention, if one or more processors detect that the SDV is under attack from an intruder, the SDV will automatically drive away. Again, assume that camera 421 shown in FIG. 4 detects an unknown/unauthorized person approaching the SDV 402. In order to ensure that the intruder does not try to take the contents out of the lockable containers 400a-400b or does not try to take or damage the SDV 402 itself, the SDV 402 will go into a "protective mode" by driving away from the area immediately.

The SDV 402 may lock the lockable containers 400a-400b and/or drive away from an intruder when stopped at pickup location 206 shown in FIG. 2, while stopped at delivery location 208, when stopped (e.g., due to traffic stoppage) along roadway 204, and/or at any other location.

In one or more embodiments of the present invention, the SDV 402 described herein may aid users in determining the value of an item by providing automatic feedback on past sales of similar items, such as the value of such goods sold at retain thrift stores, online auction sites, Internet-based community bulletin boards, etc., in order to assess the current value of the donated item being picked up by the SDV 402. For example, a user may walk up to a static SDV with a charitable donation (e.g., an optical mouse). The SDV 402 will examine the potential donation (e.g., using image analysis software on an image captured by camera 421 shown in FIG. 4), in order to 1) identify the object and 2) determine the physical condition of the object. The SDV on-board computer 301 and/or supervisory computer 201 will then data mine eCommerce sites, online auction cites, Internet-based community bulleting boards, etc. to establish the current value of the donated item, and will then offer the donor a receipt showing that current value of the donated item if the donor agrees to pass the mouse (donated item) to the SDV 402. This system is not only is this useful for the donor's records, but may also encourage the donor to submit this object (mouse) as well as other donations to the SDV 402. Furthermore, such a system will assess the aggregate value of contents in the SDV 402, which is the used to fine-tune the route of the SDV 402. For example, if the value of the donated items on the SDV 402 exceeds a certain level (e.g., more than $15,000), then the SDV 402 will be redirected to avoid hazardous routes (e.g., those with poorly maintained roadways, icy conditions, etc.) that may result in damage to the cargo/items being transported by SDV 402.

While the present invention has been described in a context of matching donors with recipients, in one or more embodiments there may not be an immediate recipient/donee. However, the charitable enterprise may still know that there is an ongoing need for particular items, even if there is not a particular person in need of those particular items at the present time. As such, the SDV 402 will nonetheless pick up the donated object known to be needed in the future (according to past records of donations being requested by donees), and will transport it to a storage location, such as a warehouse or, if space allows, within the SDV 402 itself until a requester for the donated item is identified.

In one or more embodiments of the present invention, the donation is matched to a particular type of SDV. That is, assume that a first donor has a refrigerator to be donated, and a second donor has a pair of shoes to be donated. As such, an SDV capable of loading the refrigerator (e.g., a heavy-duty truck) will be dispatched to the first donor, while a smaller (and thus cheaper to operate) SDV (e.g., a sedan) will be dispatched to the second donor.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
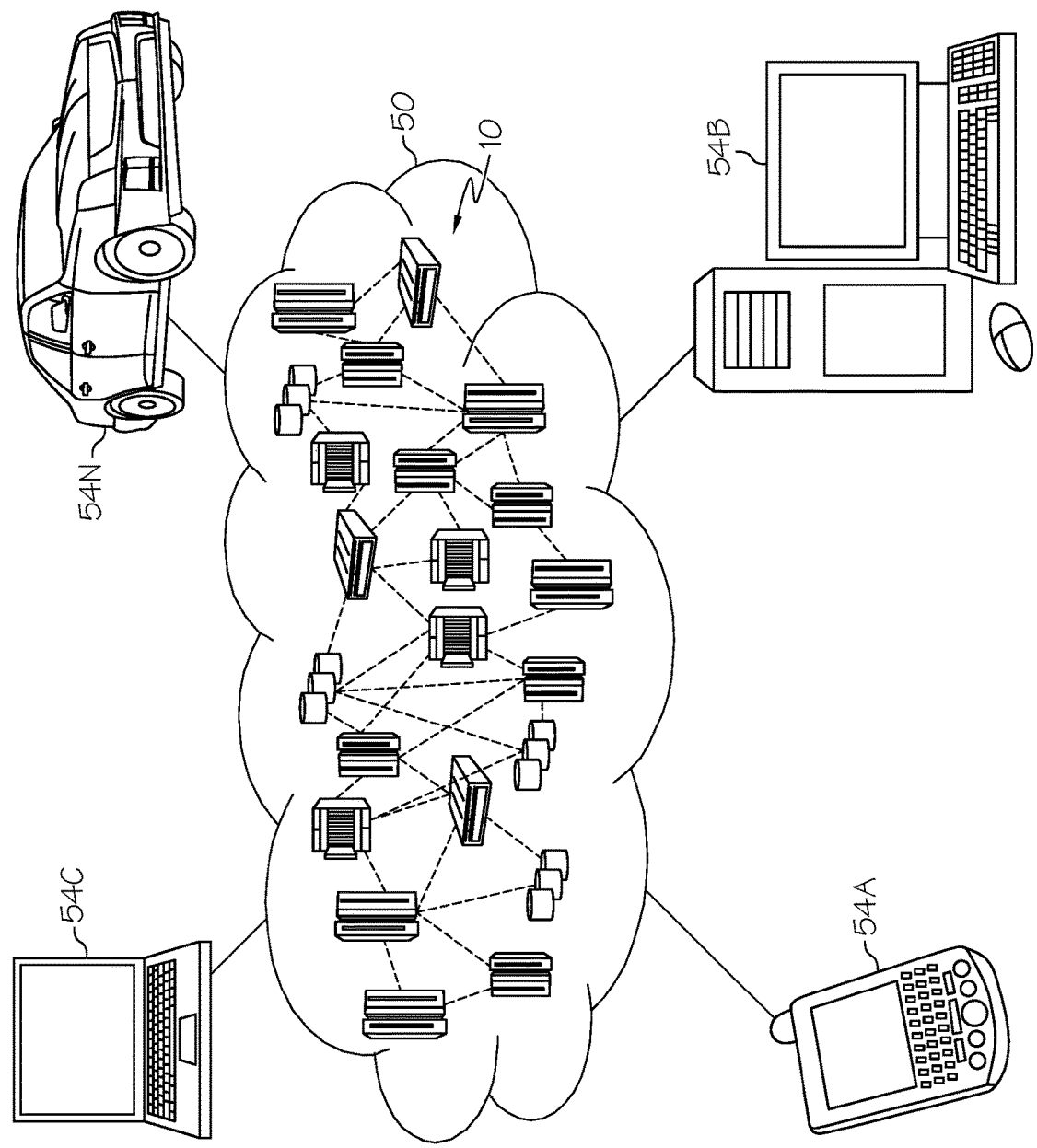
FIG. 6 depicts a cloud computing environment according to an embodiment of the present invention.

Referring now to FIG. 6, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
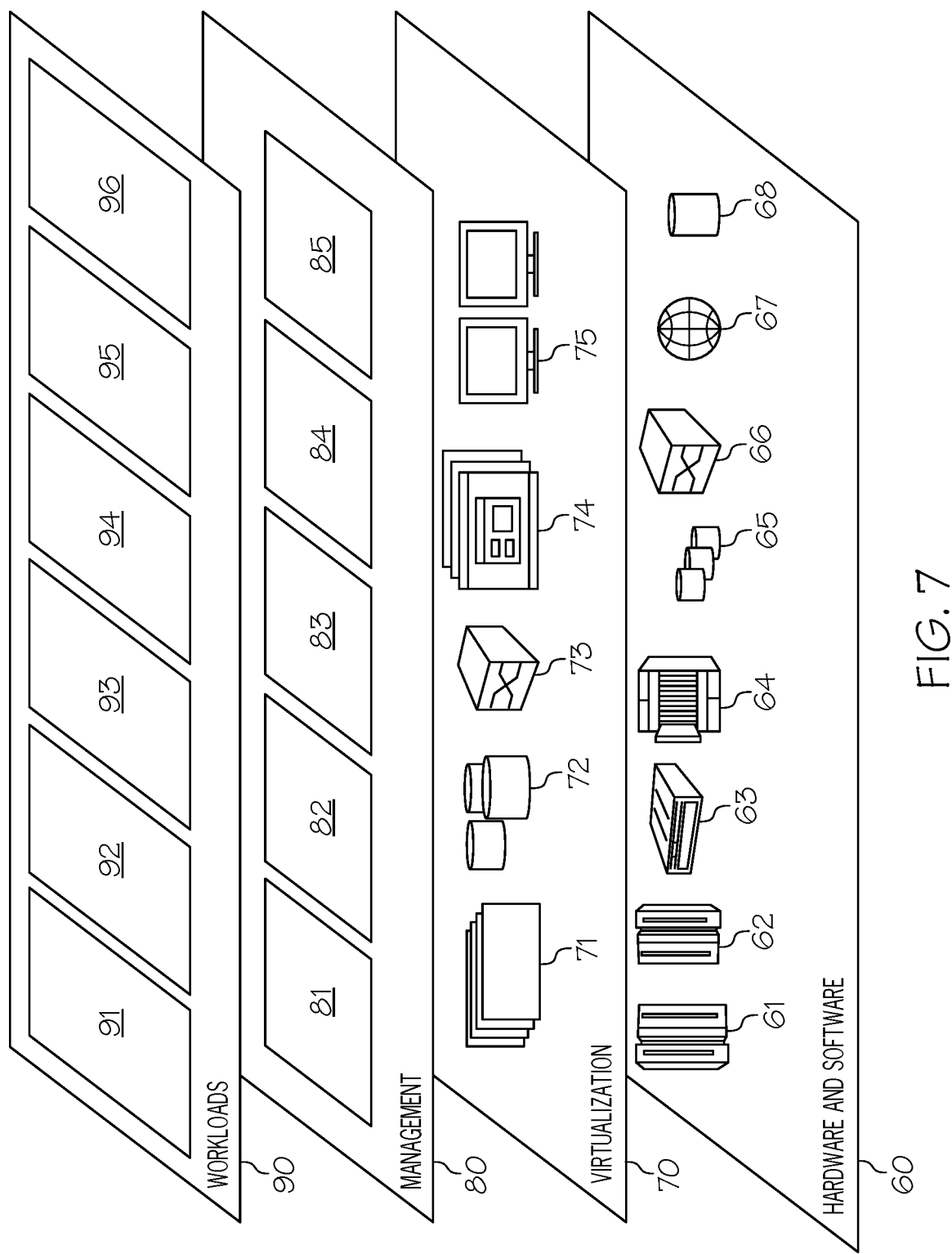
FIG. 7 depicts abstraction model layers of a cloud computer environment according to an embodiment of the present invention.

Referring now to FIG. 7, an exemplary set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and SDV configuration processing 96, in accordance with one or more embodiments of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

The present invention may be implemented through the use of a Very High Speed Integrated Circuit (VHSIC) Hardware Description Language (VHDL) program. VHDL is an exemplary design-entry language for describing an integrated circuit, such as a Field Programmable Gate Arrays (FPGA), Application Specific Integrated Circuit (ASIC), and other similar electronic devices. In other words and by way of example only, a software-implemented method according to one or more embodiments of the present invention may be emulated by a hardware-based VHDL program, which is then implemented in an VHSIC, such as a FPGA.

Having thus described embodiments of the present invention, in detail and by reference to illustrative embodiments thereof, it will be apparent that modifications and variations are possible without departing from the scope of the present invention defined in the appended claims.

What is claimed is:

1. A computer-implemented method comprising:
   receiving, by one or more processors, a first message indicating that a donor has a charitable item available for pickup from a pickup location;
   receiving, by one or more processors, a second message indicating that a recipient at a delivery location has a need for the charitable item;
   matching, by one or more processors, the charitable item to a self-driving vehicle (SDV) that is configurable to transport the charitable item from the pickup location to the delivery location;
   performing, by one or more processors, a risk analysis for transporting the charitable item from the pickup location to the delivery location, wherein the risk analysis compares a level of the need for the charitable item to a risk to the charitable item and the SDV when transporting the charitable item to the delivery location, wherein the level of the need describes a criticality of the charitable item for preserving a physical health of the recipient, and wherein the risk to the charitable item and the SDV when transporting the charitable item is based on an environment of the delivery location;
   in response to the risk analysis concluding that the level of the need for the charitable item is greater than the risk to the charitable item and the SDV when transporting the charitable item to the delivery location, modifying, by one or more processors, a physical component of the SDV to transport the charitable item from the pickup location to the delivery location, wherein the physical component is either a suspension system or a lifting mechanism, wherein the one or more processors directs either the suspension system or the lifting mechanism to adjust from a first operating setting to a second operating setting based on a fragility of the charitable item considered in the risk analysis;
   directing, by one or more processors, the SDV to transport the charitable item from the pickup location to the delivery location;
   creating, by one or more processors, a route for the SDV to travel from the pickup location to the delivery location based on a size and weight of the charitable item, roadway conditions between the pickup location and the delivery location, a presence of lockable storage compartments on the SDV, and a configuration of an adjustable suspension system of the SDV; and
   directing, by one or more processors, the SDV to transport the charitable item from the pickup location to the delivery location on the created route.

2. The computer-implemented method of claim 1, further comprising:
   video-recording, by a video camera, the charitable item while being transported from the pickup location to the delivery location.

3. The computer-implemented method of claim 1, further comprising:
   receiving, by a supervisory computer, a pickup message from a telecommunication device, wherein the pickup message is from the donor of the charitable item to confirm to the supervisory computer that the SDV picked up the charitable item from the pickup location.

4. The computer-implemented method of claim 1, further comprising:
   receiving, by a supervisory computer, a delivery message from a telecommunication device, wherein the delivery message is from the recipient of the charitable item to confirm to the supervisory computer that the SDV delivered the charitable item to the delivery location.

5. The computer-implemented method of claim 1, further comprising:
   capturing, by a video camera, an image of the charitable item at the pickup location;
   analyzing, by one or more processors, the image in order to determine a condition of the charitable item;
   determining, by one or more processors, that the condition of the charitable item does not meet a specific requirement of the recipient for the charitable item; and
   in response to determining that the condition of the charitable item does not meet the specific requirement of the recipient for the charitable item, blocking, by one or more processors, a lifting mechanism on the SDV from loading the charitable item onto the SDV at the pickup location.

6. The computer-implemented method of claim 1, wherein the charitable item is transported on the SDV in a selectively lockable container, and wherein the method further comprises:
   detecting, by one or more processors, that the SDV is under attack from an intruder; and
   in response to detecting the SDV is under attack from the intruder, locking, by instructions from one or more processors to an electro-mechanical lock on the selectively lockable container, the selectively lockable container.

7. The computer-implemented method of claim 1, further comprising:
   detecting, by one or more processors, that the SDV is under attack from an intruder; and
   in response to detecting that the SDV is under attack from the intruder, directing, by one or more processors, the SDV to drive away from the intruder.

8. The computer-implemented method of claim 1, further comprising:
   receiving, from a camera on the SDV, an image of a person approaching the SDV;

determining, by one or more processors, that the image of the person approaching the SDV is that of an unauthorized person whose image is not in a database of known donors or known recipients of charitable items; and in response to determining that image of the person approaching the SDV is that of the unauthorized person, directing, by one or more processors, the SDV to autonomously drive away from the unauthorized person immediately.

9. The computer-implemented method of claim 1, wherein the charitable item is medicine needed by the recipient.

10. The computer-implemented method of claim 7, wherein the intruder is a person who is determined to be trying to steal an item from the SDV.

11. A non-transitory computer program product for directing a self-driving vehicle (SDV) to pick up and deliver charitable items, the non-transitory computer program product comprising:

program instructions stored in the non-transitory computer program product, executed by a device causing the device to receive a first message indicating that a donor has a charitable item available for pickup from a pickup location;

program instructions stored in the non-transitory computer program product, executed by the device causing the device to receive a second message indicating that a recipient at a delivery location has a need for the charitable item;

program instructions stored in the non-transitory computer program product, executed by the device causing the device to cause the device to match the charitable item to a self-driving vehicle (SDV) that is configurable to transport the charitable item from the pickup location to the delivery location;

program instructions stored in the non-transitory computer program product, executed by the device causing the device to cause the device to perform a risk analysis for transporting the charitable item from the pickup location to the delivery location, wherein the risk analysis compares a level of the need for the charitable item to a risk to the charitable item and the SDV when transporting the charitable item to the delivery location, wherein the level of the need describes a criticality of the charitable item for preserving a physical health of the recipient, and wherein the risk to the charitable item and the SDV when transporting the charitable item is based on an environment of the delivery location;

program instructions stored in the non-transitory computer program product, executed by the device causing the device to, in response to the risk analysis concluding that the level of the need for the charitable item is greater than the risk to the charitable item and the SDV when transporting the charitable item to the delivery location, modify one or more physical components of the SDV to transport the charitable item from the pickup location to the delivery location;

program instructions stored in the non-transitory computer program product, executed by the device causing the device to direct the SDV to transport the charitable item from the pickup location to the delivery location;

program instructions stored in the non-transitory computer program product, executed by the device causing the device to create a route for the SDV to travel from the pickup location to the delivery location based on a size and weight of the charitable item, roadway conditions between the pickup location and the delivery location, a presence of lockable storage compartments on the SDV, and a configuration of an adjustable suspension system of the SDV; and program instructions stored in the non-transitory computer program product, executed by the device causing the device to direct the SDV to transport the charitable item from the pickup location to the delivery location on the created route.

12. The non-transitory computer program product of claim 11, further comprising:

program instructions stored in the non-transitory computer program product, executed by the device causing the device to video-record, by a video camera, the charitable item while being transported from the pickup location to the delivery location.

13. The non-transitory computer program product of claim 11, further comprising:

program instructions stored in the non-transitory computer program product, executed by the device causing the device to receive a pickup message from a telecommunication device, wherein the pickup message is from the donor of the charitable item to confirm that the SDV picked up the charitable item from the pickup location.

14. The non-transitory computer program product of claim 11, further comprising:

program instructions stored in the non-transitory computer program product, executed by the device causing the device to receive a delivery message from a telecommunication device, wherein the delivery message is from the recipient of the charitable item to confirm that the SDV delivered the charitable item to the delivery location.

15. The non-transitory computer program product of claim 11, further comprising:

program instructions stored in the non-transitory computer program product, executed by the device causing the device to capture an image of the charitable item at the pickup location;

program instructions stored in the non-transitory computer program product, executed by the device causing the device to analyze the image in order to determine a condition of the charitable item;

program instructions stored in the non-transitory computer program product, executed by the device causing the device to determine that the condition of the charitable item does not meet the need of the recipient for the charitable item; and program instructions stored in the non-transitory computer program product, executed by the device causing the device to, in response to determining that a condition of the charitable item does not meet a specific need of the recipient for the charitable item, block a lifting mechanism on the SDV from loading the charitable item onto the SDV at the pickup location.

16. The non-transitory computer program product of claim 15, wherein the program instructions are provided by a service in a cloud environment.

17. A system comprising:
one or more processors;
one or more computer readable memories operably coupled to the one or more processors; and
one or more computer readable storage mediums having program instructions stored on at least one of the one or more computer readable storage mediums for execution by at least one of the one or more processors via at least one of the one or more computer readable memories, the stored program instructions comprising:

program instructions to receive a first message indicating that a donor has a charitable item available for pickup from a pickup location;

program instructions to receive a second message indicating that a recipient at a delivery location has a need for the charitable item;

program instructions to match the charitable item to a self-driving vehicle (SDV) that is configurable to transport the charitable item from the pickup location to the delivery location;

program instructions to perform a risk analysis for transporting the charitable item from the pickup location to the delivery location, wherein the risk analysis compares a level of the need for the charitable item to a risk to the charitable item and the SDV when transporting the charitable item to the delivery location, wherein the level of the need describes a criticality of the charitable item for preserving a physical health of the recipient, and wherein the risk to the charitable item and the SDV when transporting the charitable item is based on an environment of the delivery location;

program instructions to, in response to the risk analysis concluding that the level of the need for the charitable item is greater than the risk to the charitable item and the SDV when transporting the charitable item to the delivery location, modify one or more physical components of the SDV to transport the charitable item from the pickup location to the delivery location;

program instructions to direct the SDV to transport the charitable item from the pickup location to the delivery location;

program instructions to create a route for the SDV to travel from the pickup location to the delivery location based on a size and weight of the charitable item, roadway conditions between the pickup location and the delivery location, a presence of lockable storage compartments on the SDV, and a configuration of an adjustable suspension system of the SDV; and program instructions to direct the SDV to transport the charitable item from the pickup location to the delivery location on the created route.

18. The system of claim 17, wherein the charitable item is transported on the SDV in a selectively lockable container, and wherein the system further comprises:

program instructions to detect that the SDV is under attack from an intruder; and program instructions to, in response to detecting that the SDV is under attack from the intruder, activate an electro-mechanical lock on the selectively lockable container in order to lock the selectively lockable container.

19. The system of claim 17, further comprising:

program instructions to detect that the SDV is under attack from an intruder; and program instructions to, in response to detecting that the SDV is under attack from the intruder, direct the SDV to immediately drive away from the intruder.

* * * * *